(No Model.)  3 Sheets—Sheet 1.

A. C. EVANS.
CABLE RAILWAY.

No. 300,058.  Patented June 10, 1884.

Attest.  
H. State.  
M. M. Converse

Inventor.  
Austin C. Evans  
B. C. Converse, Atty.

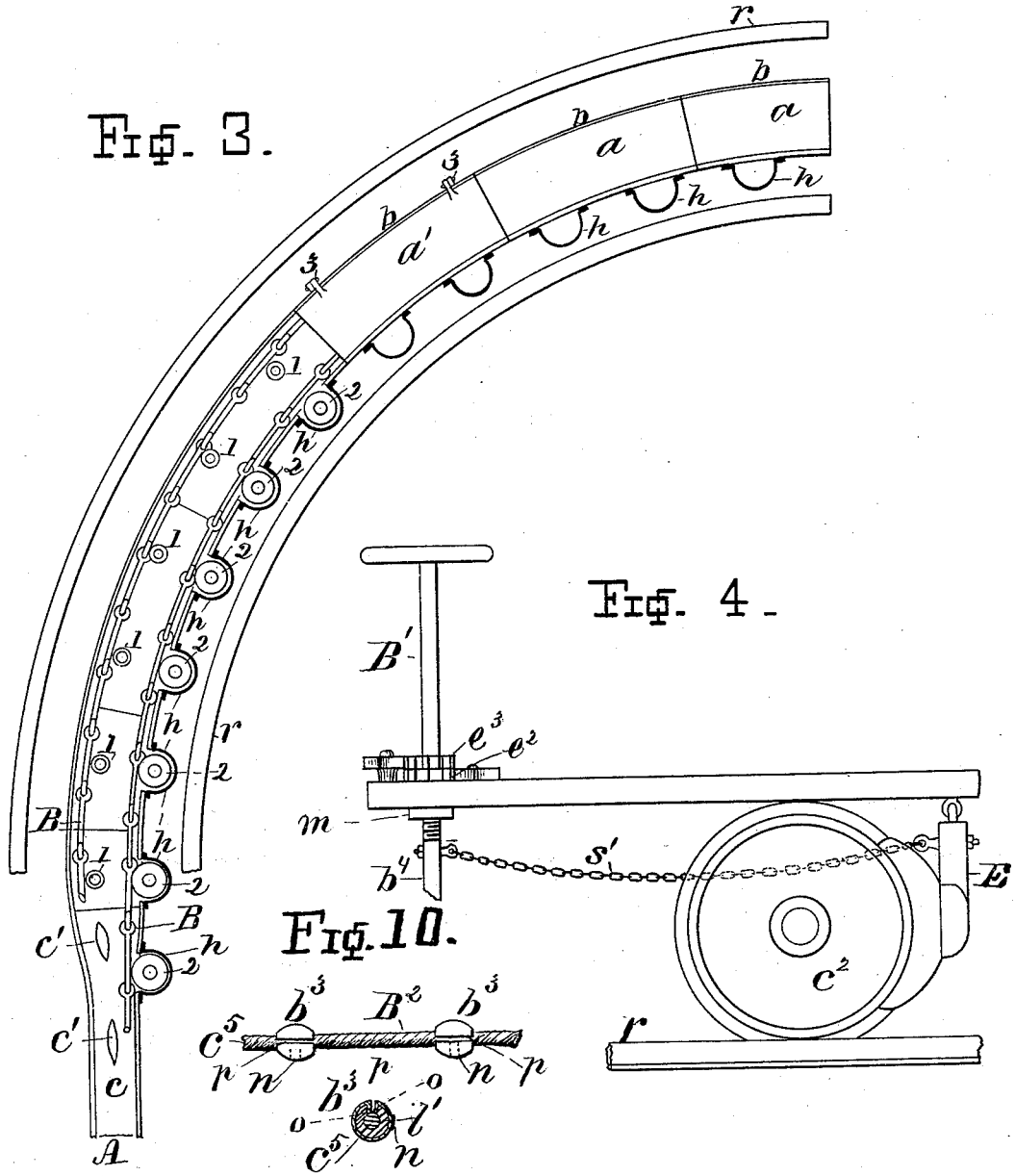

(No Model.) 3 Sheets—Sheet 3.
A. C. EVANS.
CABLE RAILWAY.
No. 300,058. Patented June 10, 1884.
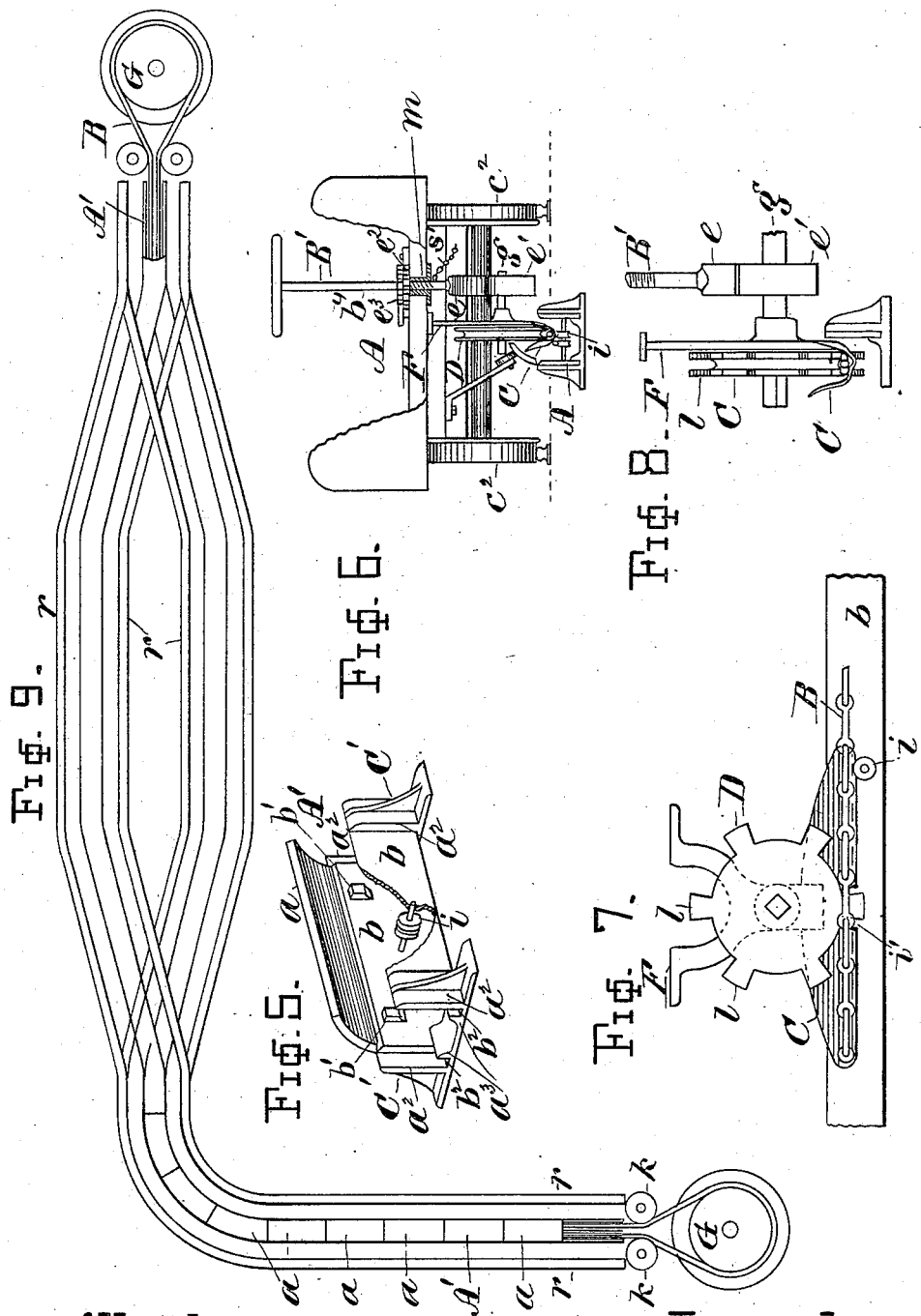

UNITED STATES PATENT OFFICE.

AUSTIN C. EVANS, OF SPRINGFIELD, OHIO.

CABLE RAILWAY.

SPECIFICATION forming part of Letters Patent No. 300,058, dated June 10, 1884.

Application filed January 5, 1884. (No model.)

*To all whom it may concern:*

Be it known that I, AUSTIN C. EVANS, a citizen of the United States of America, residing at Springfield, in the county of Clark and State of Ohio, have invented certain new and useful Improvements in Cable Railways, of which the following is a specification, reference being had therein to the accompanying drawings.

My invention relates to improvements in cable railways; and it consists of a construction and arrangement of the several parts co-operating with each other, which will be hereinafter described and claimed.

The objects of my invention are to dispense with the ordinary open tube for the cable, which is most objectionable, as it is dangerous to small-wheeled vehicles and requires large covered openings at suitable distances apart for cleaning it. It is also liable to have obstructions in the line of the cable from being dropped through the top crevice or slot. To avoid this I use a tube which is open at the bottom throughout its length, and which has a system of plate-sections covering said tube. These plates are elevated automatically by a peculiar and novel attachment to the car as the latter passes over the road, and they fall by their own gravity as soon as released, thereby completely closing and covering said tube, so as to allow the passage of vehicles over the same, and preventing any liability to obstructions in the operation of the cable, as stated. That portion of the tube embraced in curves and turn-outs and the approaches to the former has a floor, about midway of the depth of the tube, extending along under each part of the cable. This floor consists of thin light plates of iron supported upon horizontal arms or bars which extend inward from the side plates. These arms extend about one-third the width of the tube on either side, leaving the middle unsupported. Friction-rollers mounted loosely upon fixed shafts, which extend across the tube, bear the weight of the cable. Upon the inside of the curves are friction-rollers pivoted upon vertical shafts, which operate in guiding the "going-out" and "returning-in" parts of the cable, and elevated above the floor-plates at the approaches to the curves are vertical studs of double convexity in cross-section, which separate the two parts of the cable and serve to guide them when operated toward their bearing-rollers.

The construction of my improved cable and the manner of operating the car will be described hereinafter.

Figure 2:
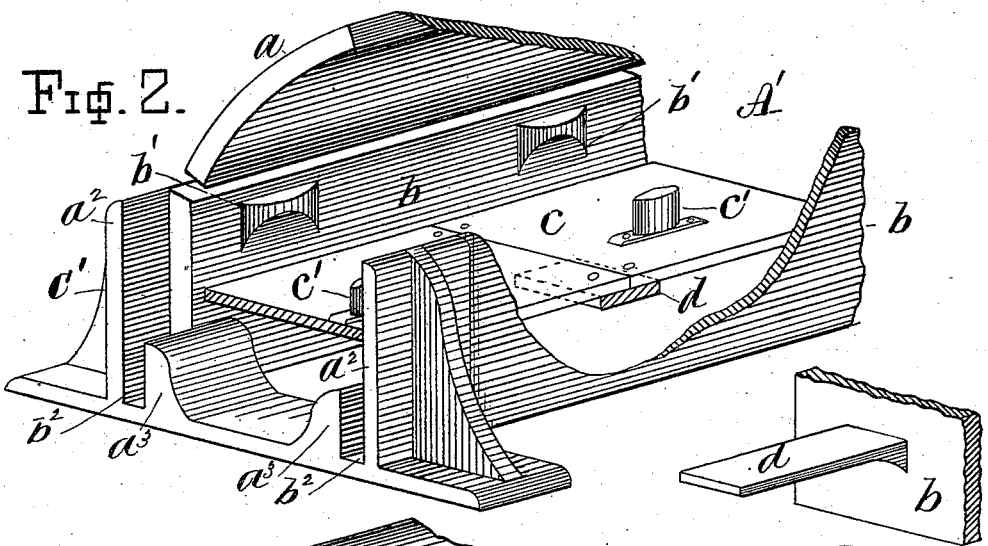
Figure 1:
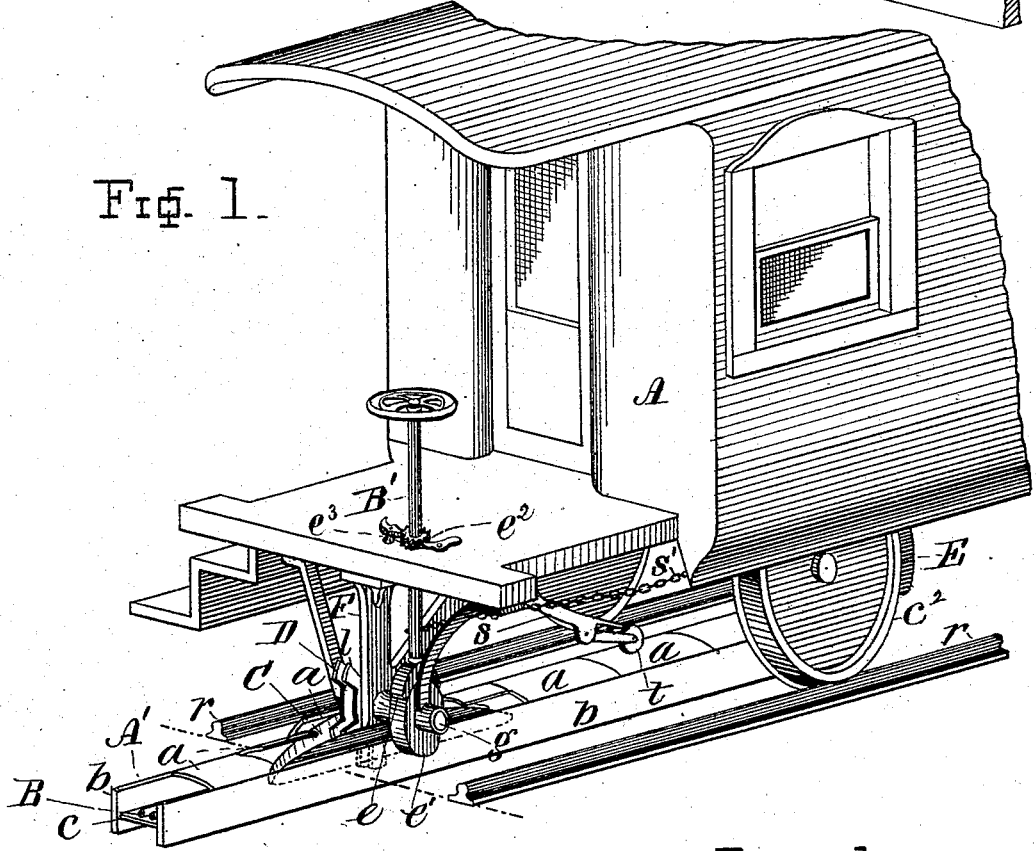

Figure 1 is an isometric view of one end of a street-car on the rails with my improved cable-tube between the latter. The attachments connected with the car for operating the covering-plates of the tube and for connecting and disconnecting the car are also shown. Fig. 2 is an enlarged view of a portion of the tube and cover with a detail of the part supporting the floor-section. Fig. 3 is a plan view of a curve-section of my improved street-railway, (single track.) In this view a chain cable is shown, and the plate-sections which cover the tube are partly removed. Fig. 4 is a side elevation of the platform of a car with the truck and brake attached. Fig. 5 is an isometric view of a section of the cable-tube, showing one of the top plates elevated. It also shows the chairs which support the tube. Fig. 6 shows an end view of a car and its attachments, also an end view of the tube or way with the operative parts in position. Fig. 7 is a side elevation of the chain-wheel and its supporting-bracket with the cable and carrier. The chain-wheel is shown in engagement with the cable. Fig. 8 is a front view of the same with the brake and pulley with which it engages, the latter being on the same shaft with the chain-wheel. A part of the cable way and carrier are also shown. Fig. 9 is a plan view of a single-track street-railway with turn-outs and drive-pulleys and my improved cable-tube complete. Fig. 10 is a view of my improved cable with a detail of one of the ball-shaped clips in cross-section.

A is the car. (Shown in Figs. 1 and 6.) It does not differ from the ordinary street-railway car, except in the attachments and appliances used in connection with the cable and tube.

A' is the tube used for the passage of the cable B. In the view Fig. 3 a chain cable is shown as one that can be used, while in Fig. 10 a wire cable, $B^2$, having ball-clips $b^3$ thereon, is seen, this form being preferably used, and as embracing a part of my improvement.

The tube A' is formed with vertical side plates, b, from which flat bars d extend horizontally inward on either side, to which the floor-plates c are bolted. The bars d may be either cast on the side plates, b, or bolted thereto. These floor-plates can be made light and thin, their use being confined simply to supporting the running cable upon curves and turn-outs and the approaches to the former. Upon straight lines the tube is entirely open at the bottom, the cable being supported upon friction-rollers i. (Seen in the views Figs. 5 and 6.) These friction-rollers consist of two spools or pulleys (in single-track railways) mounted loosely upon the same shaft, which latter extends across the inside of the tube from one side wall to another, at the required distances apart to properly support the running cable. The side walls, b, of the tube are supported by chairs C', which extend across the line of the tube at proper intervals. These chairs have an outside wall plate or standard, $a^2$, braced upon the outside, and inside of this a raised abutment, $a^3$, leaving between the two a grooved space, $b^2$, into which the lower edges of plates b are inserted, and are thereby supported in an upright position, as seen in Figs. 2 and 5. At the top of each of the plates b, near the upper edge inside, are lugs b', extending laterally inward from the side plate. These lugs support the top plates, a.

In the views Figs. 2 and 5, the covering-plates a are shown elevated considerably above the lugs b', in order that the latter may be more clearly shown. The top plates or covers, a a, are slightly convex on the outside, so as to shed water, and are fitted down inside the top edges of plates b, and connected with the latter by any suitable joint or hinge on one side to retain them in their proper relation with each other, and to prevent their being moved from their places. A little space is left between their ends to provide for expansion.

The devices for connecting the car with the cable are constructed as follows: From the platform of the car depends a bracket, F, with braces f on either side of the same. A pivotal shaft, g, extends through these across the line of the tube, and on this shaft, between the bracket and brace on one side, is a sprocket-wheel, D, the teeth of which are arranged in pairs and straddle the cable and engage with either the rings of the links in the chain cable or the ball-clips on the wire cable, the teeth l l being constantly engaged as the wheel D and its shaft g are rotated by the running cable. Bracket F has attached to its lower end a carrier, C, through which the cable is drawn. This consists of a trough-shaped piece of metal straight on the bottom part, with a hole through the latter at the middle to allow the teeth of the sprocket-wheel to pass through when rotated in engaging the cable. The upper edge of the carrier on the outside, which engages with the cover-sections of the tube to elevate them as the car is drawn along, is semicircular in the direction of its length, the middle part being high enough to cause it to lift the cover or lid sections a a the required height, as seen in Figs. 1 and 6. Figs. 2, 5, 7, and 8 also show the construction of the several parts.

In Fig. 1 the bottom of the carrier C is shown within the tube A' in dotted lines. On the opposite side of the bracket F on the same shaft, g, with that of the sprocket-wheel is seen a friction-pulley, e', and over this is a segment-shaped shoe, e, which is loosely pivoted upon the end of the shaft $b^4$ of the brake B', and as this shaft is threaded and has a nut, m, attached to the platform of the car through which it extends, the shoe e is tightened down upon the pulley by rotating the shaft to the right, and at the same time that the engagement is thus made to attach the car to the cable the truck-brake E (seen in rear of the car-wheel $c^2$) is released, this latter brake being connected with shaft $b^4$ of brake B' by a chain, s'. When the brake B' is thus applied to wheel e', the rotation of sprocket-wheel D (on the same shaft) is instantly checked, and the cable being engaged with its teeth the car is started and drawn along the track. As it is moved along, the front end of the carrier C lifts the lids or covers a a in succession, and passing under them they close easily down by their own weight, the rear part of the carrier being sloped down to its lower edge in the same manner as the front part.

To stop the car, the brake B' is turned by its hand-wheel to the left until the shoe e is released from the wheel e'. At the same time the chain s' is wrapped around shaft $b^4$ in the opposite direction and the truck-brake E clamped upon wheel $c^2$. It will be thus seen that the application of one brake causes the release of the other, both in starting and stopping the car.

To provide for the ascent and descent of the shaft $b^4$ in operating brake B', (which is but slight,) there are two ratchet-wheels, $e^2$ and $e^3$, with their pawls, which lock the brakes when operated. These ratchet-wheels are reversed upon the shaft, and a little space is left between the bottom one and the platform, to allow the endwise movement of the shaft $b^4$. When the brake B' is released from wheel e, the top ratchet-wheel, $e^3$, locks it in position, and when it is applied to the same wheel in clamping it the lower ratchet-wheel, $e^2$, and its pawl are engaged. The terminal stations do not differ from those of other cable-railway systems. The views given show only parts of a single-track railway; but in a double-track railway some of the auxiliary attachments, as the studs c', (seen in Figs. 2 and 3,) are not required.

In the construction of the cable $B^2$, (seen in Fig. 10,) the ball $b^3$ consists of a shell of malleable iron, which is bent around the cable until its two edges come nearly together. The edges of the shell are bent at an angle inward toward the center of the cable, touching the latter, the object being to so inclose the shell that lead may be poured into it through a hole, $n$, in the side and the shell entirely filled. The inwardly-bent edge confines the lead in its place and serves to strengthen the connection of the ball with the cable.

In the view Fig. 10 a cross-section of the ball is shown in detail, $c^5$ representing the wire rope; $b^3$, the ball, the shell of which has the inturned flanges $o\ o$. $l'$ is the lead filling. A narrow space, $p$, is left between the flanges $o\ o$, when the ball is completed and secured to the rope $c^5$. This form of cable is preferably used in my improved cable railway, as being lighter and less liable to get out of order than the chain cable.

I claim as my invention—

1. In a tube for cable railways, a series of covering-plates hinged or otherwise flexibly connected therewith on one side, in combination with a cable operated in said tube and a car having a carrier adapted to carry said cable, as described, and to elevate said covering-plates automatically as said car is drawn along the track of the railway.

2. A cable way or tube for a running cable, in a cable railway, open throughout its length at the bottom, and having at the curves, turnouts, and approaches to the former floor-plates supported upon arms extending from the side plates about half the depth of the same, said floor-plates being for the purpose of supporting and guiding the cable at these points, as set forth.

3. In a cable railway, the combination, with the running cable, of a tube having side plates provided with lateral arms extending inward therefrom, and floor-plates resting upon said arms, whereby said cable is supported and guided, substantially as set forth.

4. In a cable way or tube having an open bottom, the combination, with the sections forming the same, of the chairs extending across the line of the tube under the latter, having the standards and the abutments inside of the same, forming grooves between the two, adapted to support the side plates of said tube in a perpendicular position, as set forth.

5. In a cable way or tube for a single-track railway, the combination, with the floor-plates and the cable, of the vertical studs of double convex form in their cross-section, arranged upon said floor-plates to keep the two lines of said cable separate and to guide the latter toward the bearing-pulleys.

6. In a cable-railway car, a bracket and braces suspended therefrom, a shaft extending horizontally through the same rotating in bearings therein, a sprocket-wheel mounted upon said shaft on one side of said bracket, and a wheel upon the same shaft on the opposite side, said wheel being operated upon by a shoe pivotally attached to the screw-threaded shaft of the brake, whereby the connection and disconnection of the car with the cable is made by clamping said shoe upon said wheel, which stops the revolution of said shaft with the sprocket-wheel, and allows the links or balls on the cable to engage the teeth of the latter and propel the car along the track.

7. In a cable railway, a car provided with a bracket suspended from its platform, a carrier on the lower end of said bracket extending into the cable-tube, through which the cable runs, a brace on either side of said bracket, a horizontal shaft pivoted in bearings in the bracket and braces, having on one side of the former a sprocket-wheel, the teeth of which are engaged by the cable, and on the other side a wheel operated upon by a brake from the platform of the car to stop the rotation of the sprocket-wheel, whereby the latter becomes fixedly connected with said cable and the car is propelled, as set forth.

In testimony whereof I affix my signature in presence of two witnesses.

AUSTIN C. EVANS.

Witnesses:
S. W. RAY,
B. C. CONVERSE.